US 9,348,025 B2

(12) United States Patent
Urban et al.

(10) Patent No.: US 9,348,025 B2
(45) Date of Patent: May 24, 2016

(54) DEVICE AND METHOD FOR LATERAL ENVIRONMENT DETECTION OF A MOTOR VEHICLE

(71) Applicant: Volkswagen Aktiengesellschaft, Wolfsburg (DE)

(72) Inventors: Alexander Urban, Gifhorn (DE); Stephan Max, Gifhorn (DE); Claudia Prausse, Braunschweig (DE); Reiner Katzwinkel, Meine (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/488,641

(22) Filed: Sep. 17, 2014

(65) Prior Publication Data

US 2015/0078130 A1    Mar. 19, 2015

(30) Foreign Application Priority Data

Sep. 17, 2013 (DE) .......................... 10 2013 218 571

(51) Int. Cl.
| | | |
|---|---|---|
| *G08G 1/14* | (2006.01) | |
| *G01S 15/04* | (2006.01) | |
| *G01S 15/87* | (2006.01) | |
| *G01S 13/93* | (2006.01) | |
| *G01S 15/93* | (2006.01) | |

(52) U.S. Cl.
CPC ................. *G01S 15/04* (2013.01); *G01S 15/87* (2013.01); *G01S 2013/9314* (2013.01); *G01S 2015/932* (2013.01)

(58) Field of Classification Search
CPC . Y02T 10/7005; Y02T 90/121; Y02T 90/128; Y02T 90/14; Y02T 90/163; Y02T 90/169; Y02T 90/16; Y02T 10/7055; Y02T 10/7088; Y02T 10/7011; Y02T 10/705; Y02T 10/7275; Y02T 10/7291; Y02T 90/162
USPC ............. 340/932, 2, 435, 436, 539, 903, 437, 340/508, 522, 904
See application file for complete search history.

(56) References Cited

U.S. PATENT DOCUMENTS

| | | | | |
|---|---|---|---|---|
| 5,401,055 A * | 3/1995 | Pham | ..................... | B62D 61/02 180/209 |
| 6,215,415 B1 * | 4/2001 | Schroder | ............... | G01S 13/931 250/349 |

(Continued)

FOREIGN PATENT DOCUMENTS

| | | |
|---|---|---|
| DE | 199 01 847 A1 | 2/2000 |
| DE | 198 39 942 A1 | 3/2000 |

(Continued)

*Primary Examiner* — Daniel Previl

(74) *Attorney, Agent, or Firm* — Muncy, Geissler, Olds & Lowe, P.C.

(57) ABSTRACT

A device for lateral environment detection of a motor vehicle and a method for the substantially simultaneous operation of a parking support device and a door protection device is provided. The parking support device and the door protection device perform an environment detection with structurally identical environmental sensors. In order to be able to operate these simultaneously or overlapping in time, without interference by cross echo pulse occurring, it is provided to operate the simultaneously operated environmental sensors at frequencies that are shifted relative to one another and of which at least one of the frequencies is also shifted with respect to a resonance frequency of the environmental sensors.

19 Claims, 6 Drawing Sheets

(56) References Cited

U.S. PATENT DOCUMENTS

| | | | | |
|---|---|---|---|---|
| 2002/0169537 A1* | 11/2002 | Regensburger | ....... | G01S 13/931 701/96 |
| 2007/0219721 A1* | 9/2007 | Heimberger | .......... | G01S 15/931 701/300 |
| 2009/0007489 A1* | 1/2009 | Kern | ....................... | E05C 17/30 49/31 |
| 2009/0210157 A1* | 8/2009 | Lee | ....................... | G01S 15/931 701/301 |

FOREIGN PATENT DOCUMENTS

| | | |
|---|---|---|
| DE | 101 06 142 A1 | 8/2002 |
| DE | 10 2009 040 295 A1 | 3/2011 |
| DE | 10 2009 053 473 A1 | 5/2011 |
| DE | 10 2010 015 077 A1 | 10/2011 |
| DE | 10 2010 062 942 A1 | 6/2012 |
| EP | 2 127 966 A1 | 12/2009 |
| JP | 2009-190560 A | 8/2009 |
| JP | 2012-220434 A | 11/2012 |
| KR | 2000-0022785 A | 4/2000 |

\* cited by examiner

DEVICE AND METHOD FOR LATERAL ENVIRONMENT DETECTION OF A MOTOR VEHICLE

This nonprovisional application claims priority under 35 U.S.C. §119(a) to German Patent Application No. 10 2013 218 571.5, which was filed in Germany on Sep. 17, 2013, and which is herein incorporated by reference.

BACKGROUND OF THE INVENTION

1. Field of the Invention

The present invention relates to a device for lateral environment detection of a motor vehicle with a plurality of environmental sensors, which provide information for a parking support device and a door protection device. Further, the invention relates to a method for the simultaneous operation of a parking support device, which performs a parking space detection, and a door protection device for collision protection when opening at least one side door of a motor vehicle.

2. Description of the Background Art

Many devices that perform an environment detection are known from the conventional art. Normally, environment detection is performed with environmental sensors, operating according to a so-called pulse echo measuring method. An environmental sensor sends out a transmit pulse, for example, an ultrasonic pulse or an electromagnetic transmit pulse, which is reflected back from objects in the environment at least partially to the environmental sensor and is detected by said sensor as an echo pulse. A conclusion on the distance to the object is made from a time interval that passes between the sending of the transmit pulse and the receiving of the echo pulse, if the propagation speed of the sent transmit pulse is also known. Objects in the environment can be localized from a measurement data fusion via a fusion of a number of measurement results from different environmental sensors or of measurement results determined at different positions by the same environmental sensor.

In this case, the various vehicle systems that need environmental information have different requirements. A parking support device, for example, while the vehicle drives by a parking spot, would like to detect the entire lateral environment transverse to the direction of travel up to a distance of 5 m as accurately as possible. In contrast, it is sufficient for a door protection device to measure the environment in the area of a door at the distance of about 1 m, in order to be able to reliably indicate a collision risk if the door is opened and/or to actively prevent a collision. It is also important for a door protection device to detect the lateral environment even at a still low driving speed, because a measuring area covered by an environmental sensor usually cannot cover the entire pivot area of a door, in which a collision with objects can occur.

In order to enable as precise an environment detection as possible, it is desirable to possibly operate a plurality of measurement sensors simultaneously and to perform measurements with the greatest possible repeat rate.

Moreover, it is desirable for cost reasons to use as few different functional components as possible in a motor vehicle. Thus, preferably so-called equivalent parts, which are made identical, are used as functional components for a specific function. Thus, an identical part can be used at each installation location. This facilitates spare parts logistics and the replaceability of the functional components, for example. As part of fault diagnosis, functional components installed at different installation locations can be exchanged among one another in order to be able to differentiate between a defectiveness of the component and a fault in the subassembly controlling the component.

A fundamental problem in environmental sensors operating according to the pulse echo method, as do ultrasonic or radar sensors, for example, is that a transmit pulse sent by an environmental sensor generates echo pulses, which are detected not only by the environmental sensor sending the transmit pulse but also by other environmental sensors whose measuring area overlaps with a measuring area of the environmental sensor sending the transmit pulse. If it is not possible for a received echo pulse to determine the environmental sensor that has sent the associated transmit pulse, generally neither a signal transit time nor a signal path can be determined.

DE 198 39 942 A1, which corresponds to U.S. Pat. No. 6,215,415, discloses a parking aid using radar sensors, which send out transmission signals with different carrier frequencies, so that the frequencies of the received echo pulses differ from one another and assignment of the echo pulse to the individual radar sensors is possible.

DE 10 2009 053 473 A1 discloses a driver assistance device and a method for detecting an object by means of a sensor operating according to the echo transit time principle. A transmit signal with a predetermined amplitude is sent by the sensor at a transmission time. A receive signal is received by the sensor at a later receive time. The receive signal is evaluated with respect to a signal strength of the received echo pulse as to whether the echo pulse intensity is above a bottom threshold and below a top threshold. Only when this is the case is an echo pulse classified as a true echo pulse. The threshold values are dependent on the time that has passed between the sending of the transmit pulse and the time of receiving the echo pulse. The upper and lower thresholds decrease with an increasing time interval between the transmission time and the receive time. It is thereby taken into account that a signal attenuation generally occurs, the longer the signal path covered by the transmit pulse and echo pulse. If the intensity of the echo pulse is below the bottom threshold or above the top threshold, it is assumed that this is an interference pulse.

DE 10 2010 015 077 A1 discloses a method for detecting an object and a driver assistance device of a vehicle. In the described method, an ultrasonic sensor is operated in successive measurements such that the radiation characteristics of the transmit pulse are different in the successive measurements. The evaluation of the two successive measurements should also enable an angle determination to an object, in addition to a distance determination. Different radiation characteristics are achieved in an embodiment in that the ultrasonic sensor is operated at a first mechanical resonance frequency and is operated in the subsequent second measurement at a higher mechanical resonance frequency. If the ultrasonic sensor is operated at the higher mechanical resonance frequency, the ultrasonic pulse is radiated in a smaller solid angle range. In both cases, the ultrasonic sensor is operated within the ultrasonic sensor resonance range.

EP 2 127 966 A1 concerns the problem that during operation of a plurality of ultrasonic sensors in the interior of a vehicle, for example, a bus, undesirable beats can occur, if not all environmental sensors are operated at the same transmit frequency. By adjustment of the transmit frequencies, when these are not identical, a resulting beat frequency can be adjusted such that it lies outside a predetermined frequency range.

The mutual influencing of the environmental sensors is not resolved satisfactorily, when these are operated simultaneously with spatially overlapping measuring areas.

SUMMARY OF THE INVENTION

It is therefore an object of the invention to provide an improved device and an improved method with which an environment detection for both a parking support device and for a door protection device is possible with identical parts simultaneously on the same side of a motor vehicle.

In an embodiment, a basic idea of the invention is to use so-called same parts, i.e., parts that are identical, as environmental sensors for the environment detection both for the parking support device and for the door protection device. These environmental sensors thus all have the same resonance frequency.

In particular, a device for lateral environment detection of a motor vehicle is proposed, having: a plurality of environmental sensors that are identical with respect to their hardware configuration and are disposed on the motor vehicle for detecting the environment transverse to a direction of travel on the same side of the motor vehicle, a parking support device, which performs a parking space detection, and a door protection device for collision protection during opening of the doors, whereby it is provided to operate in at least one operating mode at least two of the environmental sensors of the plurality of environmental sensors at different frequencies (operating frequencies), of which at least one of these different frequencies is shifted with respect to a resonance frequency of the environmental sensors, and whereby one of these at least two environmental sensors is assigned to the parking support device and another of these at least two environmental sensors to the door protection device. In this solution, the at least two environmental sensors, which are detuned to one another with respect to their operating frequency and of which at least one is also detuned with respect to the resonance frequency of the environmental sensors, can be used independently of one another by the different devices, the parking support device and the door protection device, without these having a detrimental effect on one another during operation. A method for the simultaneous operation of a parking support device, which performs a parking space detection, and a door protection device for collision protection when opening at least one side door of a motor vehicle, whereby the parking support device and the door protection device perform a lateral environment detection of the environment transverse to a direction of travel on the same side of the motor vehicle with a plurality of environmental sensors, which are identical with respect to their hardware configuration and are disposed on the motor vehicle for detecting the environment transverse to a direction of travel on the same side of the motor vehicle, comprises the steps: operating in at least one operating mode at least two of the environmental sensors of the plurality of environmental sensors at different frequencies (operating frequencies), of which at least one of these different frequencies is shifted with respect to a resonance frequency of the environmental sensors, and whereby one of these at least two environmental sensors is assigned to the parking support device and another of these at least two environmental sensors to the door protection device. For an especially advantageous environment detection, it is now possible that in the at least one operating mode the at least two environmental sensors of the plurality of environmental sensors are operated at least partially simultaneously or overlapping in time with respect to their measurement duration. The parking support device and the door protection device are designed according to these specifications. One of the operating frequencies can coincide with the resonance frequency of the environmental sensors, whereas the other simultaneously operated environmental sensors that influence each other and/or interfere with one another during simultaneous operation in the one operating mode, are operated at different operating frequencies, which are all shifted with respect to the resonance frequency. If the environmental sensors are disposed on the same side of the motor vehicle and configured with respect to their transmit and receive characteristics so that they do not mutually affect one another or interfere with one another during simultaneous or temporally overlapping operation, these environmental sensors can be operated at the same operating frequency. Many arrays are possible here as combinations. It is important that in the one operating mode the operating frequency of one of the environmental sensors differs from all operating frequencies of the others of the plurality of environmental sensors, which could cause a disturbance or influence the measurement.

The greater the detuning of the operating frequency with respect to the resonance frequency of the environmental sensor, the higher the damping of both the radiated signal and the detected reflected echo signal. Because a larger spatial region is of interest in a parking support device than in a door protection device, it is provided in a preferred embodiment that one of these at least two environmental sensors assigned to the parking support device is operated at a frequency that is less detuned with respect to the resonance of the environmental sensors than the operating frequency at which the one other environmental sensor of these at least two environmental sensors is operated, which is assigned to the door protection device. The parking support device and the door protection device are therefore designed such that this different detuning with respect to the resonance frequency is brought about.

It is provided in an embodiment that one of the at least two environmental sensors, for example, the one assigned to the parking support device, can be operated at the resonance frequency of the environmental sensors. Also, if the transmit powers by which oscillators in the environmental sensors are excited are selected to be of the same magnitude, sent pulses are obtained that differ considerably with respect to the radiated transmit power. The radiated transmit power of a pulse of the environmental sensor operated at the resonance frequency is considerable greater than that of a pulse of an environmental sensor operated at an operating frequency that is shifted with respect to the resonance frequency. The nominal excitation power for the environmental sensors is presumed to be the same in this case.

Such an effect can be intensified in that the transmit powers with which oscillators in the environmental sensors are excited are selected as having a different magnitude. In an embodiment, therefore, the parking support device and door protection device can be designed such that in one operating mode one of these at least two environmental sensors, assigned to the parking support device, is operated with a higher nominal transmit power than the other of these at least two environmental sensors. A nominal transmit power can be regarded here to be any power necessary for operating the oscillator responsible for signal radiation. The actually radiated transmit power can differ from the nominal transmit power in that a damping occurs in the environmental sensor because of the detuning of the oscillator frequency with respect to the resonance frequency of the environmental sensor. The greater the detuning of the frequency at which the environmental sensor is operated with respect to the resonance frequency, the greater this damping at the actually radiated transmit power.

It is provided in an embodiment that the parking support device and the door protection device can be designed such that these at least two environmental sensors that are operated in the at least one operating mode at different frequencies, at least one of which is detuned or shifted with respect to a resonance frequency of the environmental sensors, are time-delayed in at least one other operating mode and operated not overlapping with respect to their measurement duration. Such an operating mode can occur in a speed range, for example, in which the greatest possible repeat rate for the individual measurements for environment detection is not needed for the parking space detection and, on the other hand, distance measurements are needed only at greater distances for a door protection device, because a vehicle speed is within a range that makes an imminent opening of the door highly unlikely. Whereas at higher driving speeds in the range of about 40 km/h a possible maximum measurement repeat rate for an environmental sensor for environment detection for detecting a parking space is desirable, at lower vehicle speeds such a maximum repeat rate for individual measurements is not strictly necessary, because the distance traveled by the vehicle between two measurements is smaller. However, within an average speed range where immediate stopping of the motor vehicle is not yet imminent, only a rough detection of the environment for the door protection device is necessary for the environmental sensors to perform their measurements interleaved in time and not overlapping.

It is provided in an embodiment that in at least one other operating mode these at least two environmental sensors that are operated in the at least one operating mode at different frequencies, at least one of which is shifted with respect to the resonance frequency of the environmental sensors, are operated time-delayed and do not overlap with respect to their measurement duration and are operated in this other operating mode at a frequency that corresponds to the resonance frequency of the plurality of the environmental sensors. As a result, at a lower nominal transmit power a higher effectively radiated transmit power and thus a greater range for the measurement can be achieved. Thus, the same environmental area (measuring area) for operating the environmental sensor can be detected at a lower energy.

Moreover, it is possible in a refinement in this at least one other operating mode that at least one additional environmental sensor of the plurality of environmental sensors assigned either to the parking support device and operated simultaneously or overlapping in time with respect to the measurement duration with the one environmental sensor of these at least two environmental sensors of the plurality of the environmental sensors, which is also assigned to the parking support device is operated at a frequency that differs from the resonance frequency of the environmental sensors and the frequency, at which one environmental sensor of these at least two of the plurality of the environmental sensors is operated, which is also assigned to the parking support device, or is assigned to the door protection device and is operated simultaneously or overlapping in time with respect to the measurement duration with the one other environmental sensor of these at least two environmental sensors of the plurality of environmental sensors, which is also assigned to the door protection device, at a frequency which differs from the resonance frequency of the environmental sensors and the frequency at which the one other environmental sensor of these at least two environmental sensors of the plurality of environmental sensors is operated in the at least one other operating mode, which is also assigned to the door protection device. This means that a plurality of sensors assigned to different devices of the vehicle, i.e., the parking support device or the door protection device, can be operated time-delayed.

It is provided in another refinement or alternative embodiment that in the one operating mode a third environmental sensor or a plurality of further environmental sensors of the plurality of environmental sensors can be operated simultaneously or overlapping in time, and the third environmental sensor or the plurality of further environmental sensors are each operated at operating frequencies that are different from the operating frequencies of the other environmental sensors operated simultaneously or overlapping in time, which would influence a measurement of the third environmental sensor or the corresponding environmental sensor of the plurality of other environmental sensors, if the environmental sensors were to be operated at the same operating frequency.

An especially good mutual suppression of echo pulses, caused by sent pulses of other environmental sensors of the plurality of environmental sensors, is achieved, particularly for a plurality of environmental sensors operated simultaneously or overlapping in time, when the operating frequencies of all are different and all are detuned with respect to the resonance frequency of the environmental sensors.

If at least two environmental sensors are operated in the one operating mode at operating frequencies that are both detuned with respect to the resonance frequency, preferably the operating frequency of the one of the at least two environmental sensors is detuned to a lower frequency than the resonance frequency of the environmental sensors, and the operating frequency of the other environmental sensor of the at least two environmental sensors is detuned to a higher frequency than the resonance frequency of the environmental sensors.

It applies in general that a nominal transmit power, matched to a detuning, is selected such that a desired radiated pulse power and range of the measuring area are achieved and nevertheless no influencing occurs on the simultaneously operated other environmental sensors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
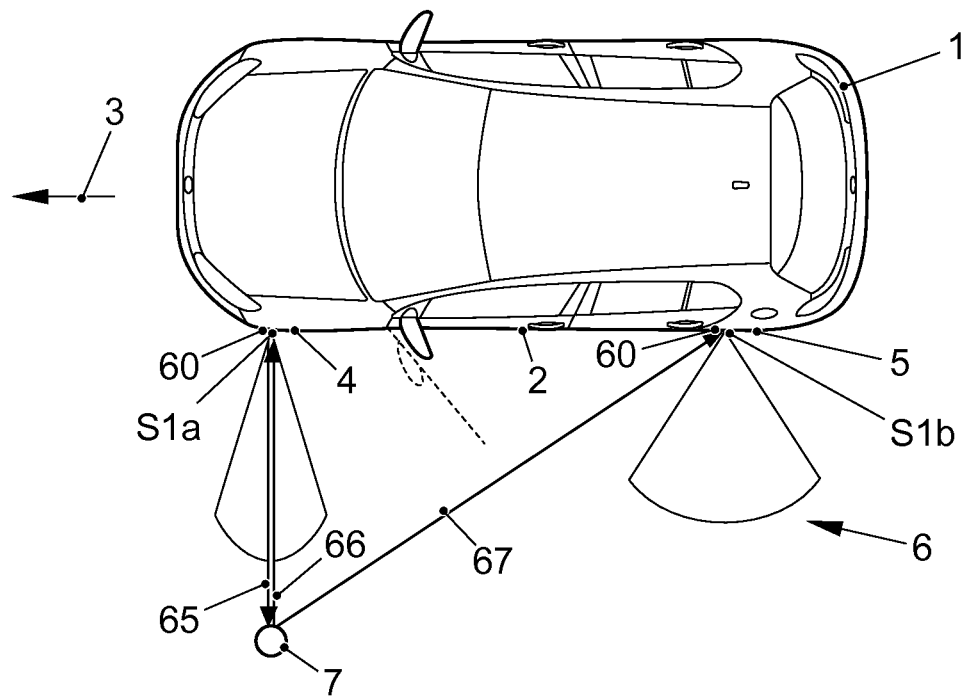
FIG. 1 shows a schematic top plan view of a passenger vehicle according to the conventional art.

A motor vehicle 1 is shown schematically in a top plan view in FIG. 1. On a vehicle side 2, which here is a left vehicle side, based on a direction of travel 3, environmental sensors 60, S1a, S1b are disposed in the area of a front wheel mounting face 4 and in the area of a back wheel mounting face 5. Environmental sensors S1a, S1b are also called environment detection sensors. Environmental sensors S1a, S1b are provided for an environment detection of an environment 6 of motor vehicle 1.

Environmental sensors S1a, S1b are preferably ultrasonic sensors. These can also be radar sensors, however. Environmental sensors S1a, S1b each send a transmit pulse 65, which, provided an object 7 is present in environment 6, is reflected back as echo pulse 66 to environmental sensors S1a, S1b. Depending on the opening angle of radiated transmit pulse 65, the speed of motor vehicle 1, and a turned-off pulse power, transmit pulse 66, sent by environmental sensor S1a, is reflected on object 7 in environment 6 such that echo pulses 66, 67 are detected both in the one environmental sensor S1a having sent the transmit pulse and in environmental sensor S1b, provided the latter is used simultaneously for detecting an echo pulse. If environmental sensor S1b is used not only as a receiver, but itself sends a transmit pulse, before it "waits" for an echo pulse, it is not possible to decide whether echo pulse 67 originates from transmit pulse 65 of environmental sensor S1a or from the transmit pulse of environmental sensor S1b itself. Thus, a conclusion cannot readily be drawn about a signal transit time and thus on a distance to a closest object in environment 6 of the motor vehicle based on the receive time of echo pulse 67.

Echo pulses 66 that originate from transmit pulse 65 sent by environmental sensor S1a, which also detects echo pulse 66, are called direct echo pulses. Echo pulses 67 received by an environmental sensor S1b and having their origin in a transmit pulse 65 of another environmental sensor S1a, are called cross echo pulses. In many cases such cross echo pulses are undesirable. In the motor vehicle shown in FIG. 1, the two environmental sensors S1a, S1b are provided for parking space monitoring. If these are spatially far apart, they might be operated simultaneously depending on the vehicle speed, without undesirable cross echo pulses occurring. It is often not possible, however, to operate both sensors simultaneously without creating undesirable cross echo pulses. Therefore, in the prior art, the two environmental sensors S1a, S1b are usually operated only alternatively, i.e., interleaved in time so that they do not measure simultaneously.

Figure 2:
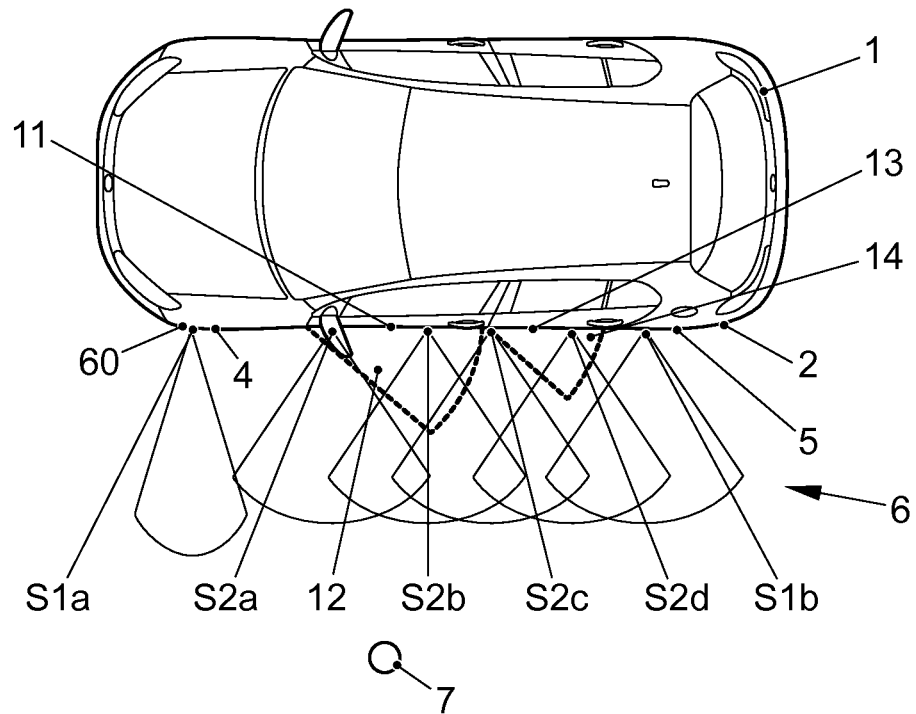
FIG. 2 shows a schematic top plan view of a passenger vehicle.

If, apart from parking space monitoring, a door protection is to be realized for a parking support device such that possible collisions with objects 7 in environment 6 of motor vehicle 1 can be avoided, additional environmental sensors S2a-S2d are needed in the area of car side 2, to be able to cover the opening area at least of a side door 11 and its pivot area 12, as is shown in FIG. 2. FIG. 2 shows such a motor vehicle 1, which apart from sensors S1a, S1b for parking space monitoring comprises environmental sensors S2a-S2d that cover pivot areas 12, 14 of doors 11, 13. The same technical features are labeled with identical reference characters in the figures.

Generally, the requirements for environment detection measurements for parking space monitoring, performed in order to find free parking spots, are different from environment monitoring measurements performed for door collision protection. Whereas measurements for parking space monitoring should scan an area up to 5 m to the side of the vehicle for objects 7 in environment 6, only an area up to about 1 m to the side of vehicle 1 is of interest for door collision. In addition, flat objects, such as high curb edges, are also of enormous interest for door protection, so that environmental sensors for door protection usually measure at a lower height above a roadway than environmental sensors for parking space monitoring, which also are to detect reliably objects at a greater distance. If the sensors for parking space detection are disposed very close to the roadway, because of reflections on the flat roadway high subsurface echo portions are disadvantageous for a signal-to-noise ratio in the case of echo pulses from distant "real objects" in environment 6 of the vehicle.

It is therefore of particular interest that a parking support device and a door protection device can each use at least one environmental sensor independently of the other device and thus also overlapping in time or simultaneously to the measurement, without a detrimental effect on the measurement of the other device and its environmental sensor.

Moreover, it is typical and desirable in motor vehicles that the employed environmental sensors are all structurally identical with respect to the hardware. This will result in lowering the cost for purchasing and production of such parts, as well as only one environmental sensor type needed to be kept in stock. Moreover, in possible troubleshooting already installed environmental sensors can be exchanged in the vehicle in order to test whether in fact the environmental sensor or downstream control and/or evaluation electronics are defective. Environmental sensors S1a, S1b, S2a-S2d therefore all have the same resonance frequency fr.

Figure 4A:
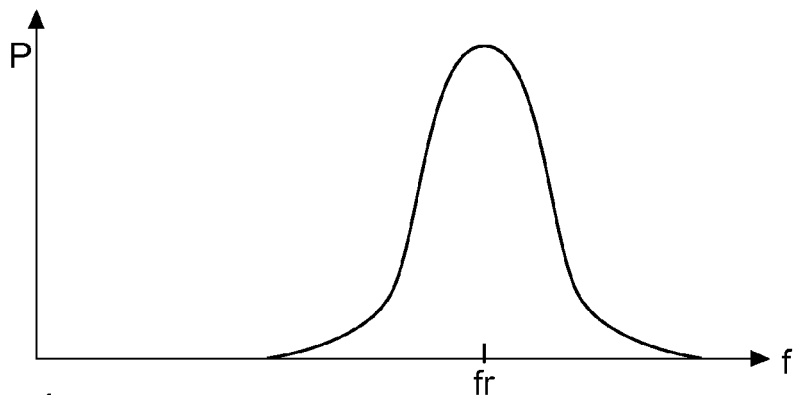
FIG. 4a shows a schematic graphical representation to illustrate the resonance frequency of employed environmental sensors.

This is illustrated schematically in FIG. 4a. A radiated pulse power Pa is plotted versus the operating frequency f of the environmental sensors. An excitation occurs for all operating frequencies with the same nominal transmit power. It is evident that at a resonance frequency fr a much higher pulse power is radiated than in a detuning of the operating frequency to a higher frequency or a lower frequency than the resonance frequency. This behavior is now utilized according to the invention.

Figure 4B:
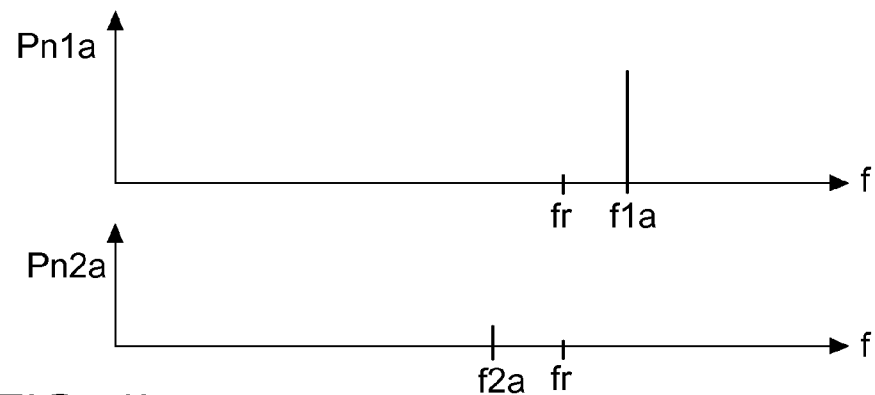
FIG. 4b shows a schematic graphical representation from which the operating frequencies of at least two environmental sensors can be derived.

In FIG. 4b, by way of example, the nominal transmit power Pn1a for environmental sensor S1a and Pn2a for environmental sensor S2a is plotted graphically versus the frequency. The nominal transmit power indicates the excitation power that is supplied electrically, for example, to the environmental sensor for radiating a transmit pulse. It can be seen that the nominal transmit power Pn1a for environmental sensor S1a is selected greater than the nominal transmit power Pn2a for environmental sensor S2a. It is also evident that relative to the resonance frequency fr the operating frequencies f1a and f2a for the corresponding environmental sensors S1a and S2a are detuned in the opposite direction. In the shown embodiment, the detuning for the two operating frequencies f2a and f1a is symmetric. In other embodiments this may be selected differently.

Figure 4C:
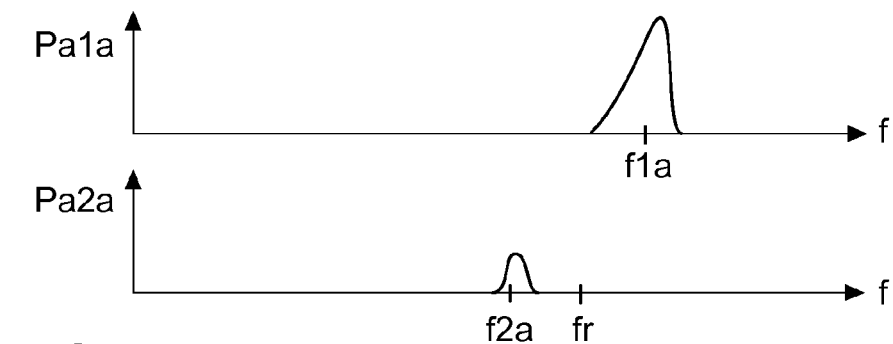
FIG. 4c shows a schematic graphical representation of the resulting frequency profiles of the radiated transmit pulses.

In FIG. 4c, the radiated transmit powers Pa1a and Pa2a of the transmitted echo pulses are plotted schematically graphically versus the frequency. It is easily visible that the two sent transmit pulses are sent out substantially at different frequencies.

Figure 4D:
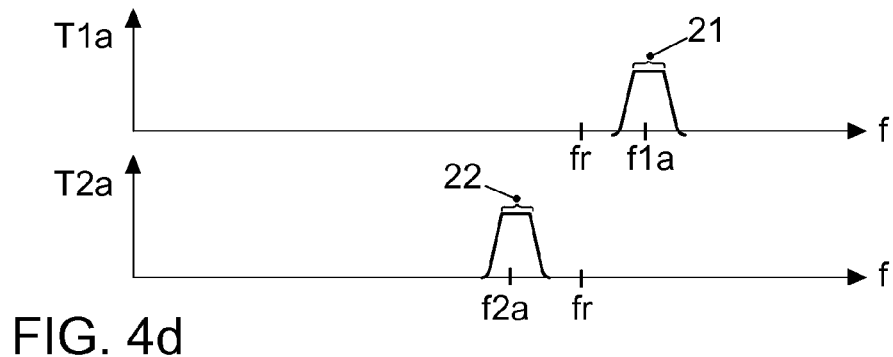
FIG. 4d shows a schematic graphical representation to explain the digital filters for filtering the detected echo pulses.

In FIG. 4d, by way of example, the transmission T1a, T2a of the digital filters of the environmental sensors are plotted versus the frequency with which the received echo signals are filtered. It can be seen easily that passband ranges 21, 22 of the filters of environmental sensors S1a and S2a coincide with the frequency ranges in which the corresponding environmental sensor sends out its transmit pulse. This leads to cross echo pulses being greatly damped in the digital filters, without having a detrimental effect on an evaluation of echo pulses. A transmit pulse sent out by environmental sensor S1a, whose maximum lies at frequency f1a, is considerably damped by the digital filter of environmental sensor S2a, because the frequency f1a is outside passband range 22 of the digital filter of environmental sensor S2a. The same applies conversely to a transmit pulse and the resulting echo pulse of environmental sensor S2a, which environmental sensor S1a detects, but is strongly damped by the digital filter of environmental sensor S1a. It is possible as a result to operate the two structurally identical environmental sensors simultaneously or overlapping in time, without these influencing one another disadvantageously. The prerequisite is that they are operated at different operating frequencies, which are shifted with respect to the resonance frequency.

Figure 3:
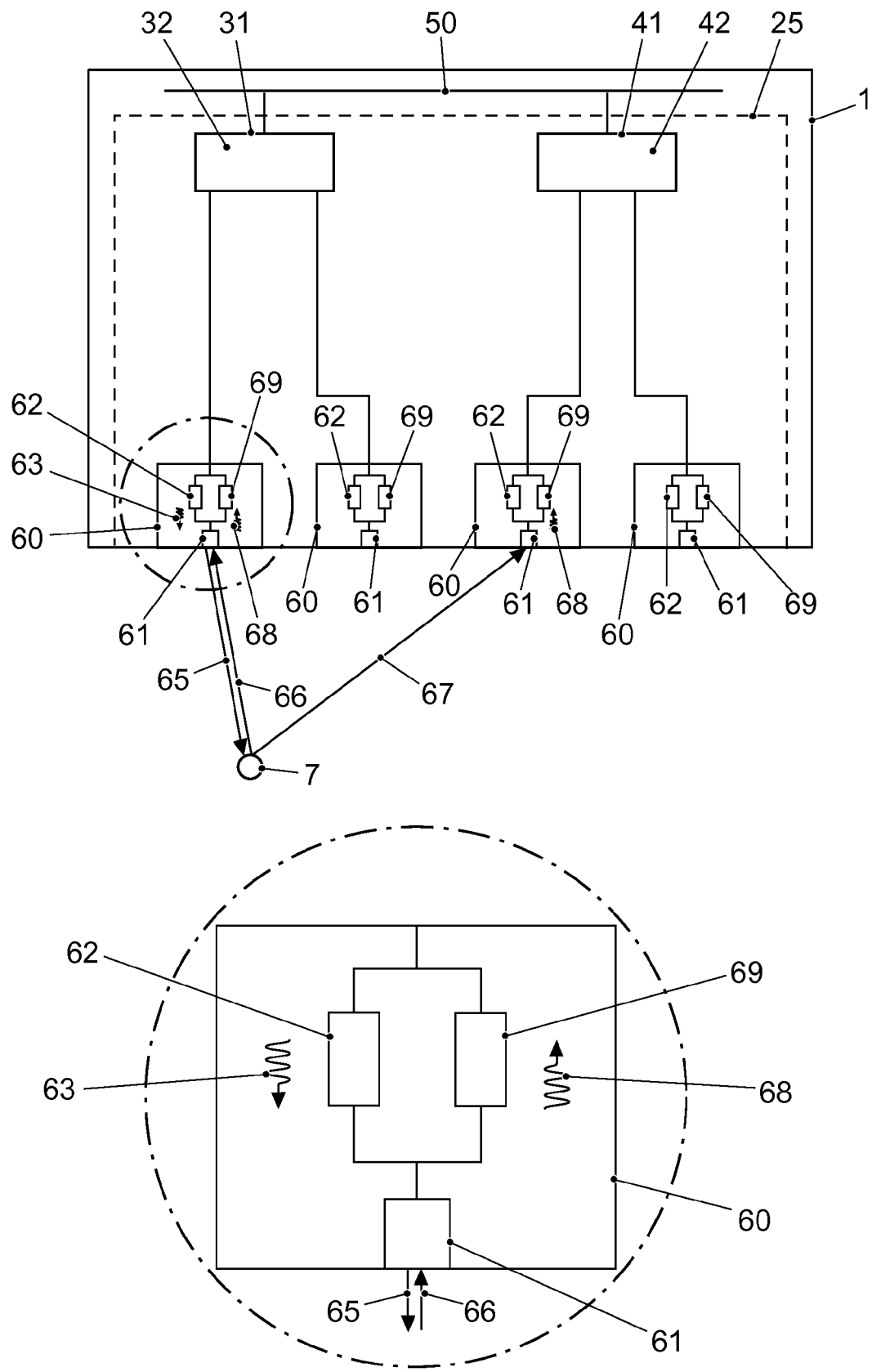
FIG. 3 shows a schematic block diagram of a motor vehicle with a device for simultaneous environment monitoring for a parking support device and a door protection device.

A motor vehicle 1 with a device 25, which enables environment monitoring for a parking support device 32 and a door protection device 42, is again shown schematically in FIG. 3. Device 25 thus comprises a parking support device 32, formed in a first control device 31, and a door protection device 42 formed in a second control device 41. Support device 32 or first control device 31 and door protection device 42 or second control device 41 are connected together, for example, via a vehicle data bus 50. Door protection device 42, for example, outputs an acoustic and/or optical warning signal in case of a threat of collision with an object when opening the door. Alternatively or in addition, the door can be locked or a pivoting movement made difficult or totally or partially blocked.

Motor vehicle 1 and device 25, moreover, have a plurality of structurally identical environmental sensors 60, S1a, S1b, S2a, S2b. The environmental sensors designated with the number 1 in this embodiment are assigned to parking support device 32 and also indicated by Latin letters. Environmental sensors 60 designated with the number 2 in this embodiment are assigned to door protection device 42 and also indicated by Latin letters. In the shown embodiment, environmental sensors 60 are formed, for example, as ultrasonic sensors. These each have a mechanical oscillator 61 driven by an electrical oscillating circuit 62 with an oscillating signal 63, to send out a transmit pulse 65 that is reflected on an object 7 in environment 6 and reflected back as echo pulse 66 to environmental sensor 60. Oscillator 61 is excited to produce oscillations and converts these into an electrical oscillating signal 68 that is supplied to a digital filter 69 and is filtered there with respect to the frequency. In this case, the frequency of the oscillating signal 63 and a passband range of digital filter 69 are matched to one another. Electrical oscillating circuit 62, digital filter 69, and other control electronics can all be formed in an integrated component.

In an operating mode, both the parking support device 32 and door protection device 42 can operate at least one of their assigned environmental sensors S1a, S2a from the plurality of environmental sensors 60, when the operating frequency f1a, at which parking support device 32 operates its environmental sensor S1a, is selected as different from the frequency f2a, at which the door protection device operates its environmental sensor S2a, and both operating frequencies f1a and f2a are detuned with respect to the resonance frequency fr of environmental sensors 60. This was already explained extensively in connection with FIGS. 4a to 4d.

Figure 5:
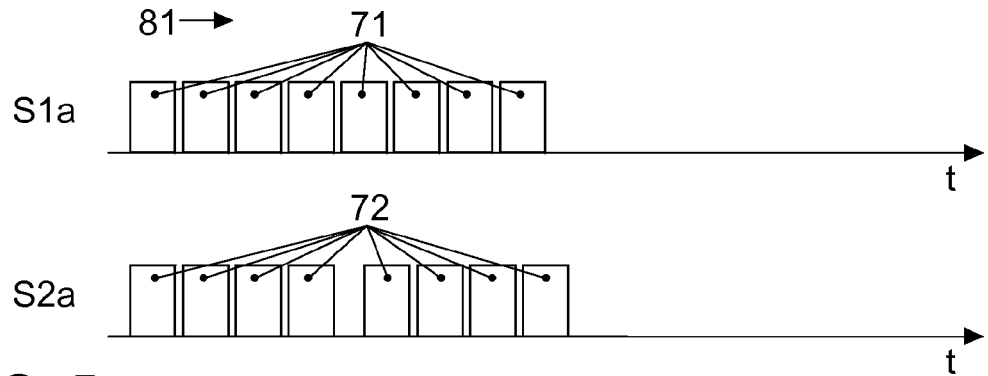
FIG. 5 shows a schematic time diagram in an operating mode in which at least two environmental sensors perform an environment detection overlapping in time.

In FIG. 5, a time diagram for an operating mode 81 is shown in which the individual measurement cycles of environmental sensors S1a and S1b are operated, for example, in the just described embodiment according to FIG. 3. Because of the different operating frequencies, no detrimental mutual influence on the measurements occurs. It can be seen that the individual measurements 71, 72 can be performed simultaneously or overlapping in time.

Figure 6:
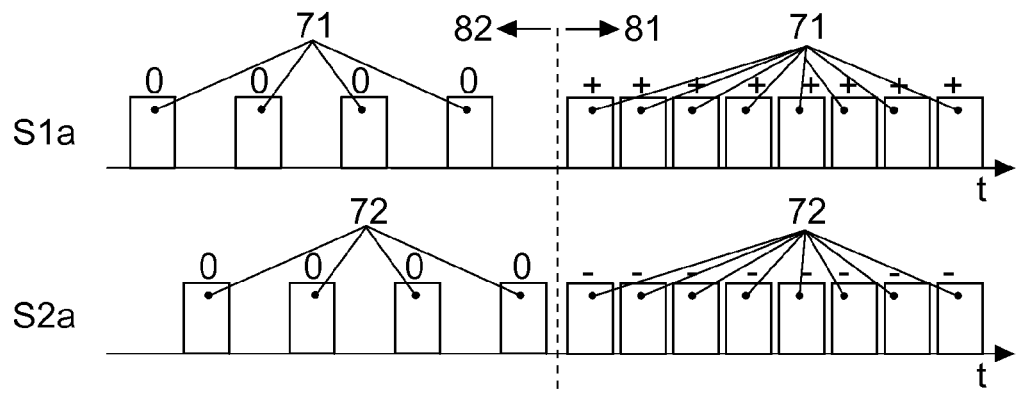
FIG. 6 shows a further time diagram to explain the succession of measurement sequences of at least two environmental sensors in different operating modes.

In FIG. 6, a further time diagram is shown with different operating modes 81, 82 occurring in the time sequence. In the shown embodiment, the device is operated in a further operating mode 82 before it is operated in the one operating mode 81. In the further operating mode 82, environmental sensor S1a of the parking support device is operated alternatingly with environmental sensor S2a of the door protection device. Measurements 71, 72 are indicated versus the time. In addition, it is indicated using a designation "0, +, −" whether the particular environmental sensor is operated at the resonance frequency, i.e., not detuned "0", detuned to a higher frequency "+" or detuned to a lower frequency "−". If the environmental sensors of the parking support device and the door protection device are operated alternatingly, they can be operated at the resonance frequency. For this reason, the nominal transmit power, i.e., the power of the electronic oscillating signal 63 according to FIG. 3, can be lower to obtain the same radiated transmit pulse power compared to these environmental sensors being operated at a frequency detuned with respect to the resonance frequency fr.

In the further operating mode 82 where environmental sensors S1a and S2a are operated alternatingly, these are not detuned with respect to the resonance frequency fr in the shown exemplary embodiment. In the time sequence, however, in a further operating mode, a switch is made to the one operating mode 81 in which the individual measurements 71, 72 of environmental sensor S1a and S2a are taken simultaneously or at least overlapping in time. In this one operating mode 81, the operating frequencies are detuned with respect to the resonance frequency. A "+" indicates that environmental sensor S1a is operated detuned to a higher frequency versus the resonance frequency fr, and a "−" indicates that environmental sensor S2a is operated detuned to a lower frequency versus the resonance frequency.

Figure 7:
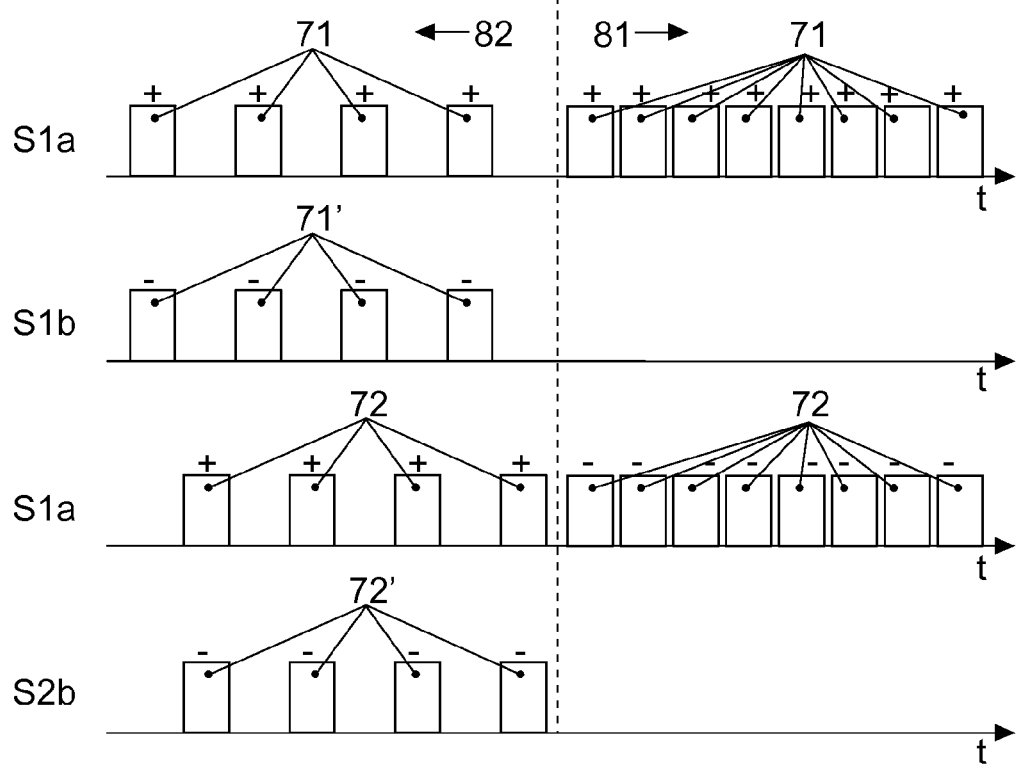
FIG. 7 shows a time diagram to explain the operation of a plurality of environmental sensors in different operating modes.

In FIG. 7, a time diagram is shown in which in the one further operating mode 82, where the parking support device and the door protection device operate their environmental sensors alternatingly, the parking support device operates two environmental sensors S1a and S1b simultaneously or overlapping in time and, delayed thereto in time, the door protection device also operates two environmental sensors S2a and S2b. The simultaneously operated environmental sensors S1a, S1b or S1a, S2b are each detuned to one another and the resonance frequency of the environmental sensors, as indicated by the signs "+", "−". At a later time, the vehicle changes to a different operating mode, the one operating mode 81 where the parking support device and the door protection device simultaneously perform the environment measurements. In this mode, the parking support device operates environmental sensor S1a, which is detuned to a higher frequency with respect to the resonance frequency, and the door protection device sensor S2a, which is detuned to a lower frequency with respect to the resonance frequency. The other environmental sensors S1b, S2b are not operated. Measurements 71, 71' are used by the parking support device and the measurements 72, 72' by the door protection device.

It is clear to the person skilled in the art that more than two sensors can also be operated simultaneously, provided the sensors are all operated at different operating frequencies, which preferably are each shifted with respect to the resonance frequency of the structurally identical environmental sensors.

Figure 8A:
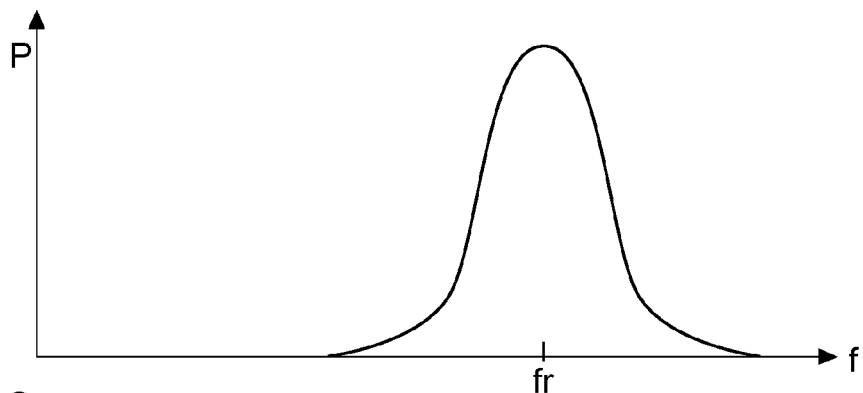
FIG. 8a shows a further schematic graphical representation to illustrate the resonance frequency of employed environmental sensors.
Figure 8B:
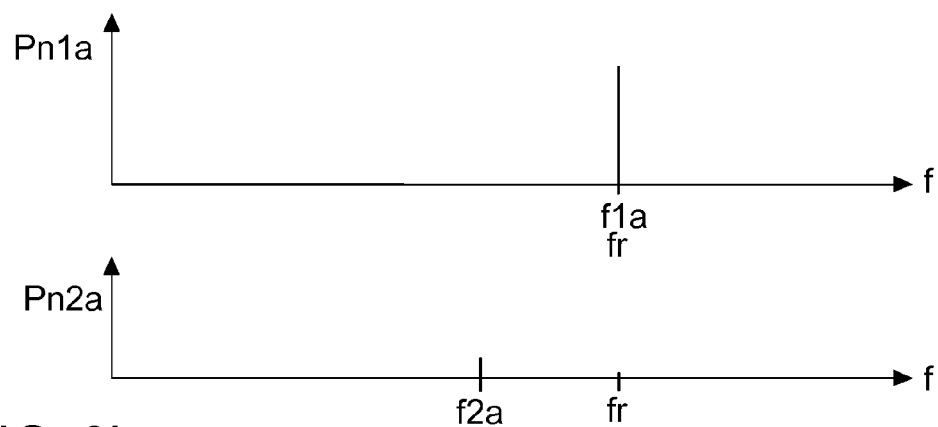
FIG. 8b shows a schematic graphical representation from which the operating frequencies of at least two environmental sensors can be derived, whereby one corresponds to the resonance frequency of the environmental sensors.
Figure 8C:
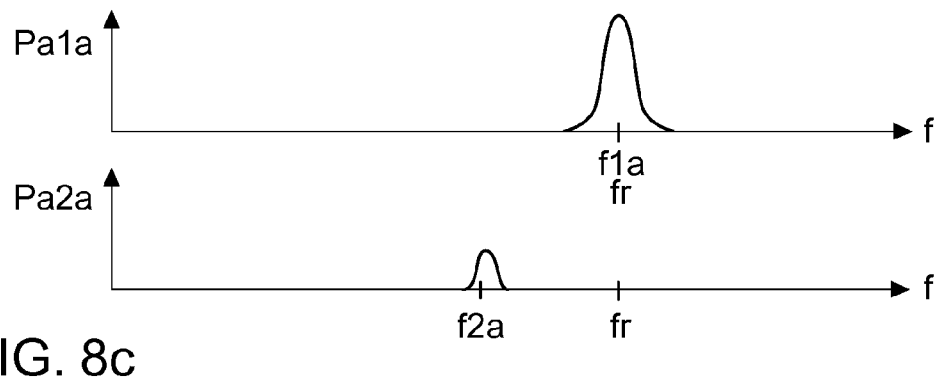
FIG. 8c shows a schematic graphical representation of the resulting frequency profiles of the radiated transmit pulses.
Figure 8D:
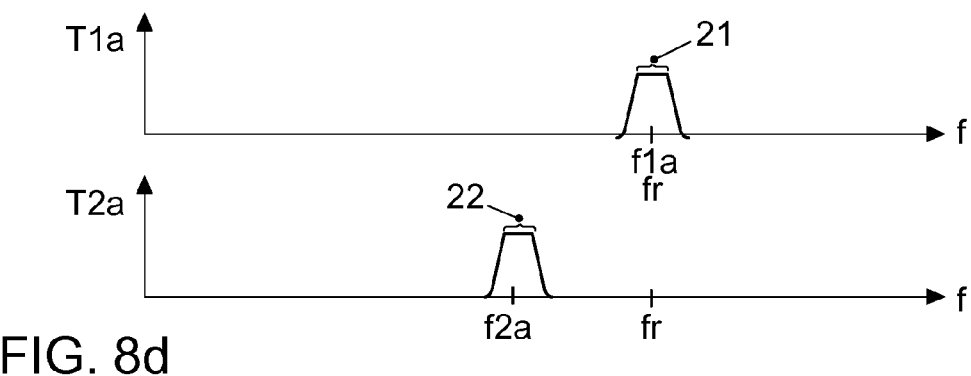
FIG. 8d shows a schematic graphical representation to explain the digital filters for filtering the detected echo pulses.

In FIGS. 8a to 8c, analogous to FIGS. 4a to 4d, a similar design of an embodiment is shown, in which, however, one of the environmental sensors, for example, environmental sensor S1a of the parking support device, is operated at the resonance frequency fr of the environmental sensors and another environmental sensor, for example, environmental sensor S2a of the door protection device, is operated at a different frequency and thus detuned with respect to the resonance frequency fr. In FIG. 8a, the resonance curve of structurally identical environmental sensors is again shown. The transmit power is plotted versus the frequency, whereby an excitation occurs in each case independent of the frequency with the same power. In FIG. 8b, the nominal transmit powers occur at the frequency f1a, which corresponds to the resonance frequency fr, and the frequency f2a is shown, which is lower than the resonance frequency fr. In this embodiment as well, the nominal transmit power Pn2a of sensor S2a, assigned to the door protection device, is preferably selected as lower than the nominal transmit power Pn1a of sensor S1a, assigned to the parking support device. The ratio of the nominal transmit powers Pn1a:Pn2a at the corresponding operating frequencies f1a and f2a is selected smaller than in the example according to FIGS. 4a to 4d. On the one hand, the ratio of the radiated transmit power Pa1a to the nominal transmit power Pn1a at the operating frequency f1a of environmental sensor S1a is better than in the embodiment according to FIGS. 4a to 4d, because the frequency f1a in this case coincides with the resonance frequency fr. On the other hand, however, at the same frequency spacing f1a-f2a in both embodiments, in the embodiment according to FIG. 8 a nominal transmit power Pn2a for sensor S2a in relation to the nominal transmit power Pn1a of sensor S1a is necessary, because a damping due to the greater spacing from the resonance frequency in the embodiment according to FIG. 8 for the sensor S2a is greater. In this case, the extent of the detuning of the operating frequencies of both environmental sensors relative to one another and the "widths" of the resonance curves in FIGS. 4a and 8a are assumed to be the same in both embodiments. In FIG. 8c, the obtained radiated pulse powers Pa1a and Pa2a are plotted versus the frequency. The radiated pulse power of sensor S1a is "distributed" symmetrically about the frequency f1a or the resonance frequency fr. The radiated pulse power plotted against the frequency for sensor S2a, in contrast, is slightly asymmetric to the operating frequency. In FIG. 8d, the transmissions T1a and T2a of the digital filters of sensors S1a and S2a and their passband ranges 21, 22 plotted versus the frequency f can again be seen.

Figure 9:
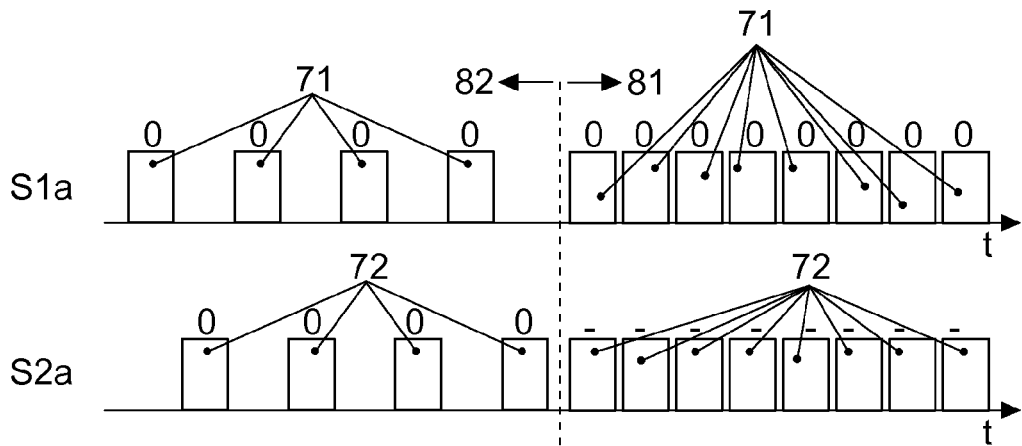
FIG. 9 shows a further time diagram to explain the succession of measurement sequences of at least two environmental sensors in different operating modes.

An embodiment similar to that according to FIG. 6 is shown in FIG. 9. It differs from the embodiment according to FIG. 6 only in that in the one operating mode 81 in which environmental sensor S1a of the parking support device and sensor S2a of the door protection device are operated simultaneously, the operating frequency of sensor S1a coincides with the resonance frequency of the environmental sensors. The operating frequency of sensor S2a of the door protection device, in contrast, is detuned, for example, to a lower frequency than the resonance frequency such that the echo pulses resulting from environmental sensor S1a are suppressed in environmental sensor S2a to such an extent that no negative influence on the measurement occurs. A converse influencing also does not occur due to the detuning.

Figure 10:
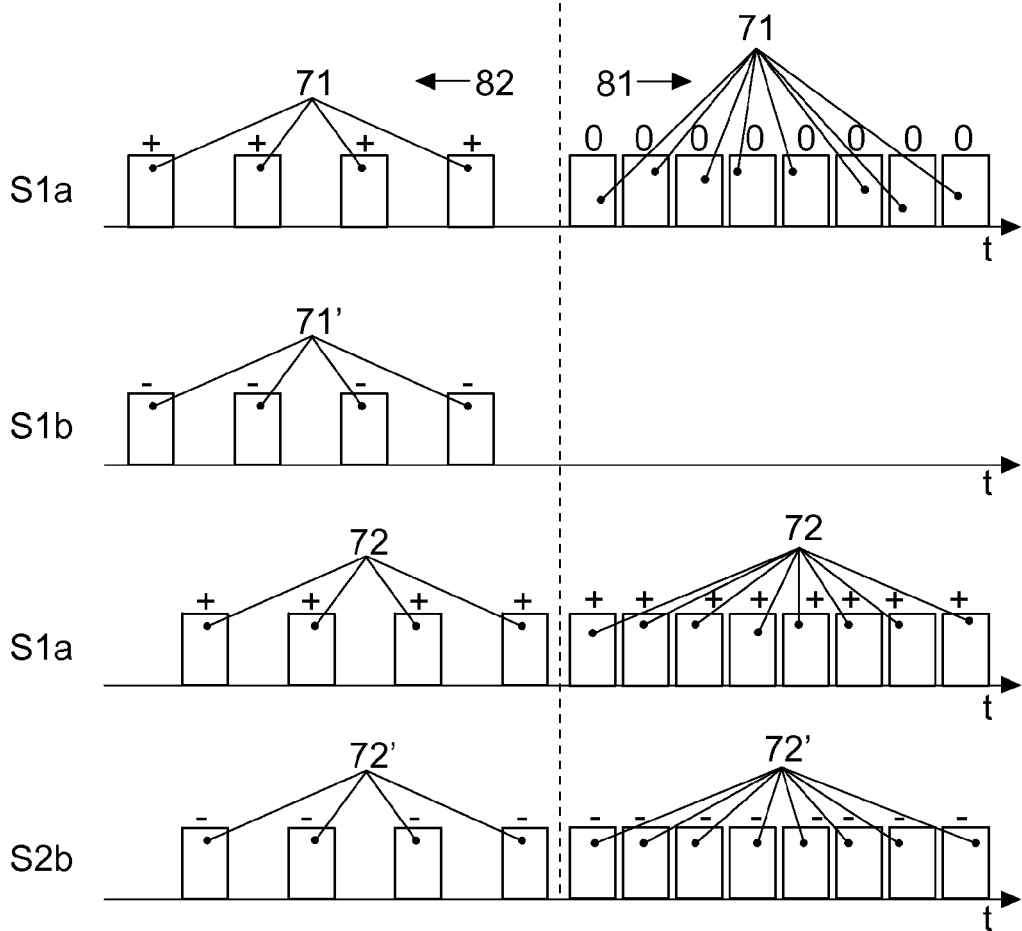
FIG. 10 shows a further time diagram to explain the operation of a plurality of environmental sensors in different operating modes.

Another embodiment is shown in FIG. 10 resembling the one according to FIG. 7. In the one operating mode 81, environmental sensor S1a is again operated at an operating frequency f1a, which coincides with the resonance frequency, indicated by the designation "0". In this embodiment, however, not only environmental sensor S1a of the door protection device, as in the embodiment according to FIG. 7, but in addition also environmental sensor S2b of the door protection device are operated simultaneously in the one operating mode 81. As indicated by the designations, the operating frequency of environmental sensors S1a and S2b of the door protection device in the one operating mode 81 is selected such that they are detuned differently with respect to the resonance frequency. An embodiment is shown in which in the one operating mode 81 environmental sensor S1a is detuned to a higher frequency than the resonance frequency fr and the operating frequency of sensor S2b is detuned to a lower frequency than the resonance frequency. In the shown embodiment, the detuning does not change between the further operating mode 82 and the one operating mode 81. In a further embodiment, the detuning of environmental sensors S2a and S2b that are operated simultaneously in both operating modes 81, 82, can be changed. It is only important that in the one operating mode 81 both are sufficiently detuned with respect to the resonance frequency and thereby with respect to the operating frequency of sensor S1a and are sufficiently detuned relative to one another. An embodiment would also be possible in which both are detuned to a lower frequency or both to a higher frequency than the resonance frequency with their operating frequency, but in addition are detuned relative to one another in order not to influence each other negatively.

It is understood further that other operating modes are also possible, for example, an operating mode in which only one of the two devices operates two environmental sensors simultaneously and the other device only one environmental sensor with a time delay, etc.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for lateral environment detection of a motor vehicle, the device comprising:
    a plurality of environmental sensors that are substantially identical in hardware configuration and are arranged on the motor vehicle for detecting an environment transverse to a direction of travel on a same side of the motor vehicle;
    a parking support device that performs a parking space detection; and
    a door protection device for collision protection when opening a door,
    wherein, in at least one operating mode at least two environmental sensors of the plurality of environmental sensors are operated at different frequencies,
    wherein at least one of the different frequencies is shifted with respect to a resonance frequency of the environmental sensors, and
    wherein an environmental sensor of at least two environmental sensors is assigned to the parking support device and another environmental sensor of the at least two environmental sensors is assigned to the door protection device.

2. The device according to claim 1, wherein the parking support device and the door protection device operate in that the at least one operating mode and the at least two environmental sensors of the plurality of environmental sensors operate at least partially simultaneously or overlapping in time with respect to a measurement duration.

3. The device according to claim 1, wherein the parking support device and the door protection device are designed such that different frequencies of the at least two environmental sensors of the plurality of environmental sensors in at least one operating mode are both shifted with respect to the resonance frequency, and wherein at least one of the different frequencies is shifted to a lower frequency than the resonance frequency and at least one other of the different frequencies is shifted to a higher frequency than the resonance frequency.

4. The device according to claim 1, wherein the parking support device and the door protection device are designed so that the one environmental sensor of the at least two environmental sensors assigned to the parking support device is operated at a frequency that is not detuned or detuned to a lesser degree with respect to the resonance frequency of the environmental sensors than the frequency at which another environmental sensor of the at least two environmental sensors is operated, which is assigned to the door protection device.

5. The device according to claim 1, wherein the parking support device and the door protection device are designed so that in the at least one operating mode the one environmental sensor of the at least two environmental sensors assigned to the parking support device is operated with a higher nominal transmit power than the one other environmental sensor of the at least two environmental sensors.

6. The device according to claim 1, wherein the parking support device and the door protection device are designed so that the at least two environmental sensors, which are operated in the at least one operating mode at different frequencies, at least one of which is shifted with respect to a resonance frequency of the environmental sensors, are operated time-delayed in at least one other operating mode and not overlapping with respect to a measurement duration.

7. The device according to claim 1, wherein each of the plurality of environmental sensors has a same resonance frequency.

8. The device according to claim 1, wherein all of the plurality of environmental sensors are disposed on a same side of the motor vehicle.

9. The device according to claim 1, wherein the parking support device and the door protection device are designed so that the one environmental sensor of the at least two environmental sensors assigned to the parking support device is operated at a frequency that is not detuned with respect to the resonance frequency of the environmental sensors.

10. The device according to claim 1, wherein the parking support device and the door protection device are designed so that the one environmental sensor assigned to the parking support device is operated at a frequency that is detuned to a lesser degree with respect to the resonance frequency of the environmental sensors than the frequency at which another environmental sensor of the at least two environmental sensors is operated, which is assigned to the door protection device.

11. The device according to claim 1, wherein at least one of the environmental sensors is operated at the resonance frequency of the environmental sensors.

12. The device according to claim 1, wherein an operating mode of the environmental sensors assigned to the parking support device are time delayed with respect to environmental sensors assigned to the door protection device or the operating mode of the environmental sensors assigned to the door protection device are time delayed with respect to environmental sensors assigned to the parking support device.

13. A method for the simultaneous operation of a parking support device, which performs a parking space detection, and a door protection device for collision protection when opening at least one side door of a motor vehicle, the parking support device and the door protection device performing a lateral environment detection of an environment transverse to a direction of travel on a same side of the motor vehicle with a plurality of environmental sensors that have a substantially identical hardware configuration and are disposed on the motor vehicle for detecting the environment transverse to a direction of travel on the same side of the motor vehicle, the method comprising:
    operating, in at least one operating mode, at least two environmental sensors of the plurality of environmental sensors at different frequencies;
    shifting, at least one of the frequencies with respect to a resonance frequency of the environmental sensors;
    assigning an environmental sensor of the at least two environmental sensors to the parking support device; and
    assigning another environmental sensor of the at least two environmental sensors to the door protection device.

14. The method according to claim 13, wherein, in the at least one operating mode, the at least two environmental sensors of the plurality of environmental sensors are operated at least partially simultaneously or overlapping in time with respect to a measurement duration.

15. The method according to claim 13, wherein the one environmental sensor of the at least two environmental sensors assigned to the parking support device is operated at a frequency not detuned or detuned lower with respect to the resonance frequency of the environmental sensors than the frequency at which the one other environmental sensor of the at least two environmental sensors is operated, which is assigned to the door protection device.

16. The method according to claim 13, wherein, in the at least one operating mode, the one environmental sensor of the at least two environmental sensors assigned to the parking support device is operated with a higher nominal transmit power than the one other environmental sensor of the at least two environmental sensors.

17. The method according to claim 13, wherein the at least two environmental sensors, which are operated in the at least one operating mode at different frequencies, of which at least one is shifted with respect to a resonance frequency of the environmental sensors, is operated time-delayed in at least one other operating mode and not overlapping with respect to a measurement duration.

18. The method according to claim 17, wherein the at least two environmental sensors, which are operated in the at least one operating mode at different frequencies, of which at least one is shifted with respect to a resonance frequency of the environmental sensors and is operated time-delayed in at least one other operating mode and not overlapping with respect to the measurement duration, are operated in this other operating mode at a frequency which corresponds to the resonance frequency of the plurality of the environmental sensors.

19. The method according to claim 17, wherein, in the at least one other operating mode, at least one additional environmental sensor of the plurality of the environmental sensors is operated, which is assigned either to the parking support device and is operated substantially simultaneously or overlapping in time with respect to the measurement duration with the one environmental sensor of the at least two environmental sensors of the plurality of environmental sensors, which is also assigned to the parking support device at a frequency that differs from the resonance frequency of the environmental sensors and the frequency at which the one environmental sensor of the at least two of the plurality of the environmental sensors is operated, which is also assigned to the parking support device or is assigned to the door protection device and is operated substantially simultaneously or overlapping in time with respect to the measurement duration with the one other environmental sensor of the at least two environmental sensors of the plurality of the environmental sensors, which is also assigned to the door protection device at a frequency that differs from the resonance frequency of the environmental sensors and the frequency at which the one other environmental sensor of the at least two environmental sensors of the plurality of environmental sensors is operated, which is also assigned to the door protection device.

* * * * *